Aug. 19, 1958  H. JUNGHANS ET AL  2,847,818
ELECTROMAGNETICALLY OPERATED CLOCKS
Filed Feb. 18, 1953  6 Sheets-Sheet 2
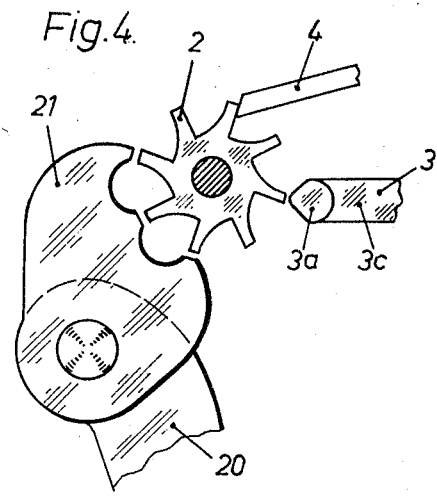
Fig.4.
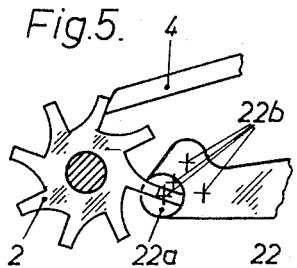
Fig.5.
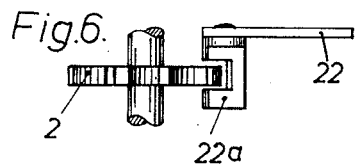
Fig.6.
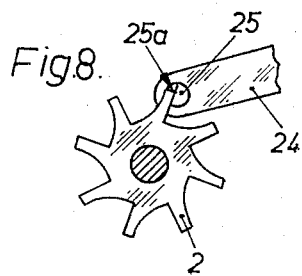
Fig.8.
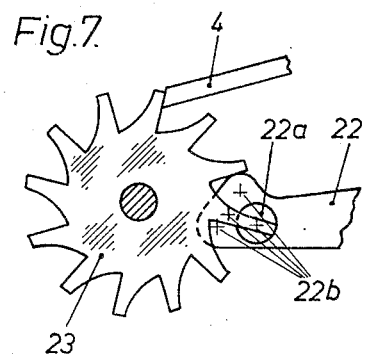
Fig.7.
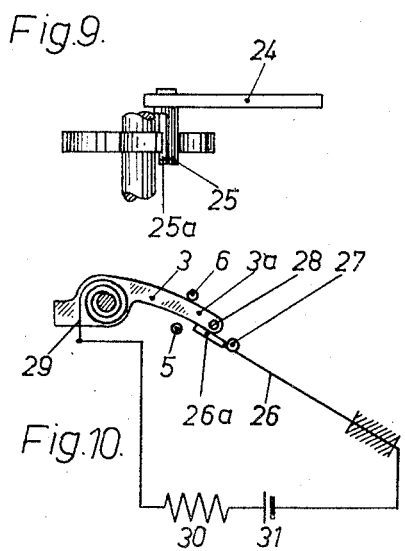
Fig.9.
Fig.10.
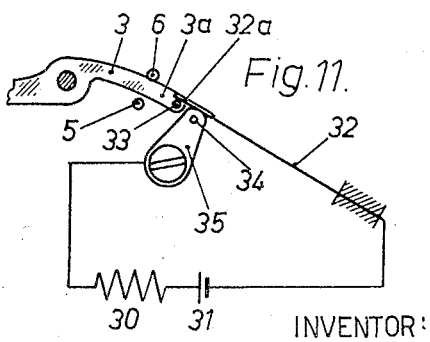
Fig.11.
INVENTOR:
H. JUNGHANS & L. HARTNER
BY Young, Emery & Thompson
ATTORNEYS

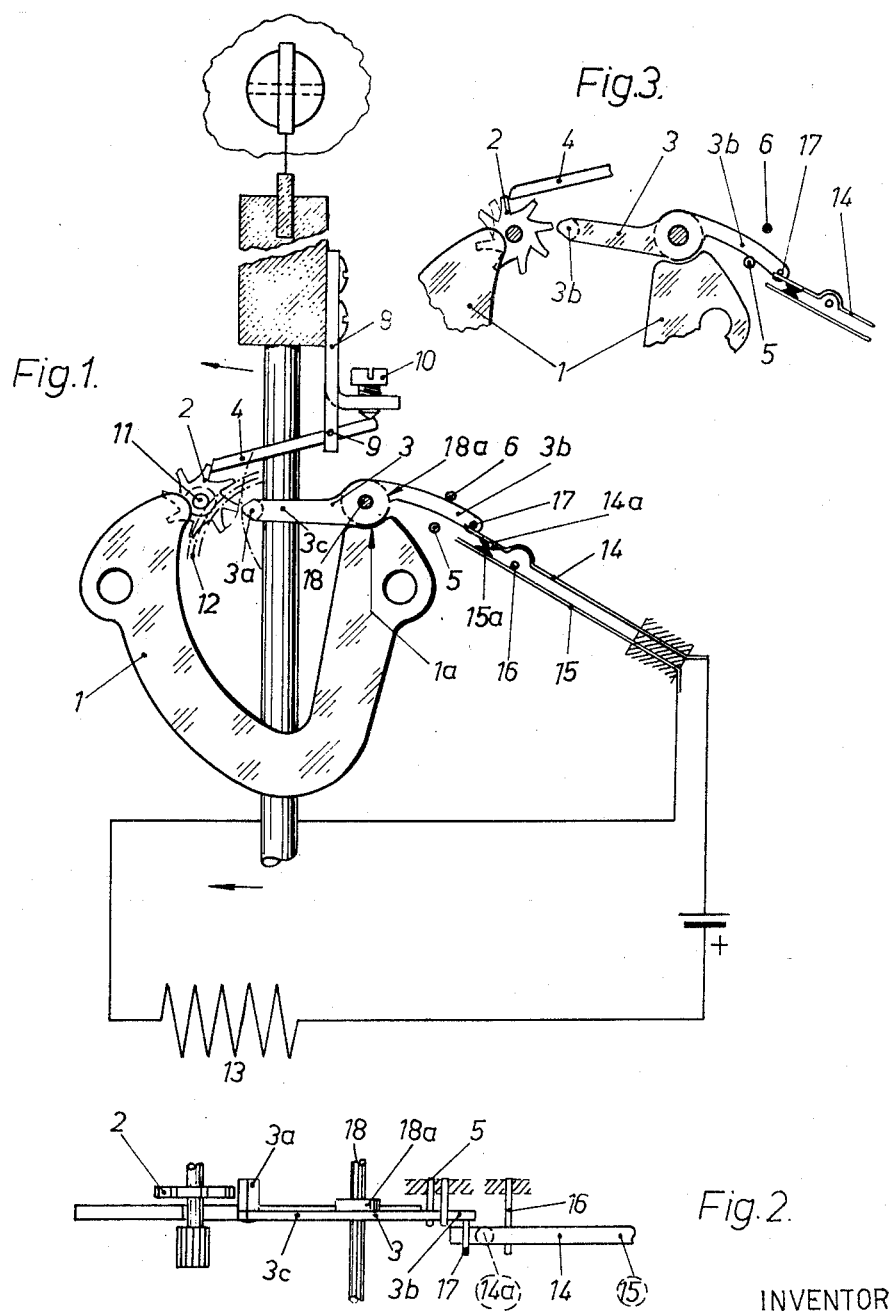

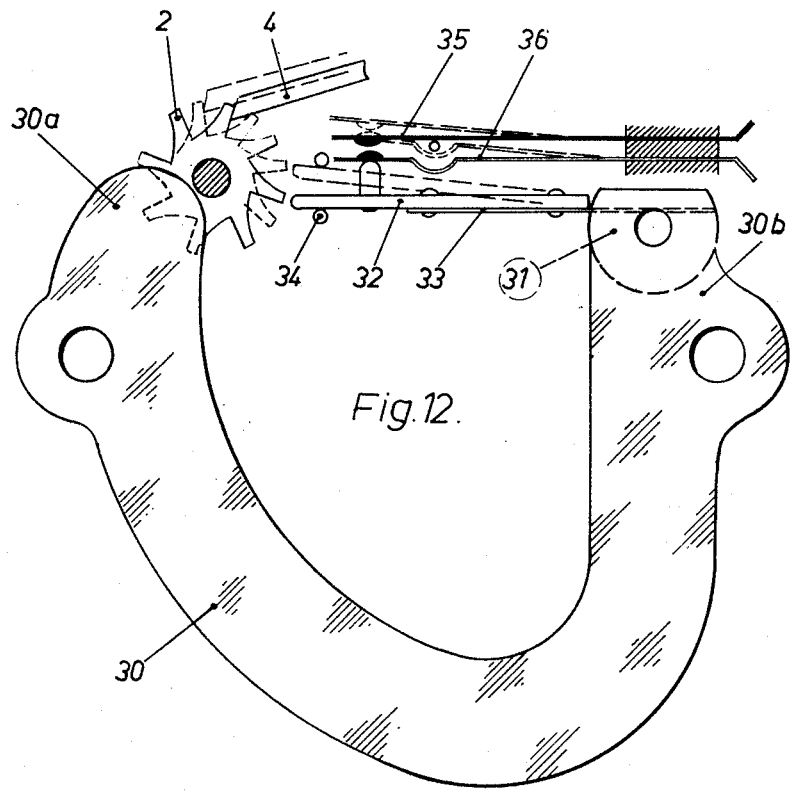
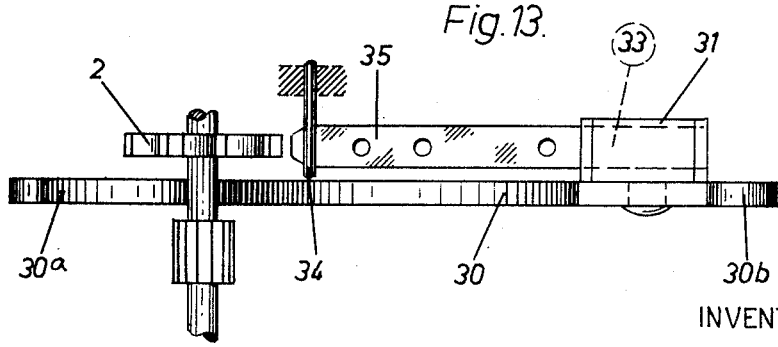

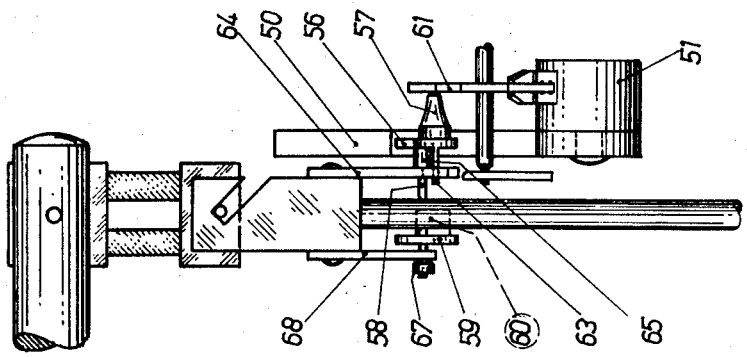
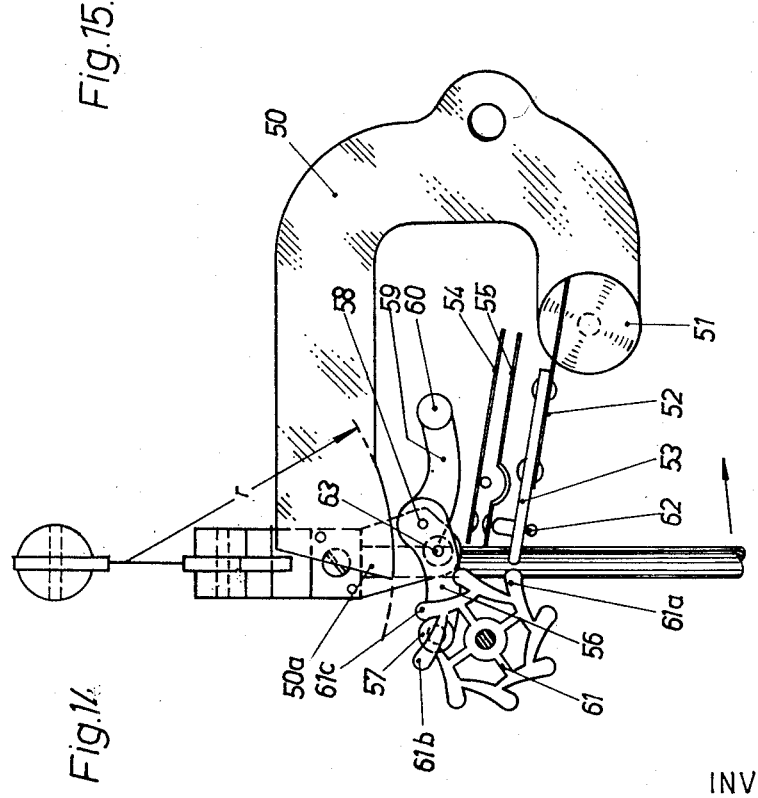

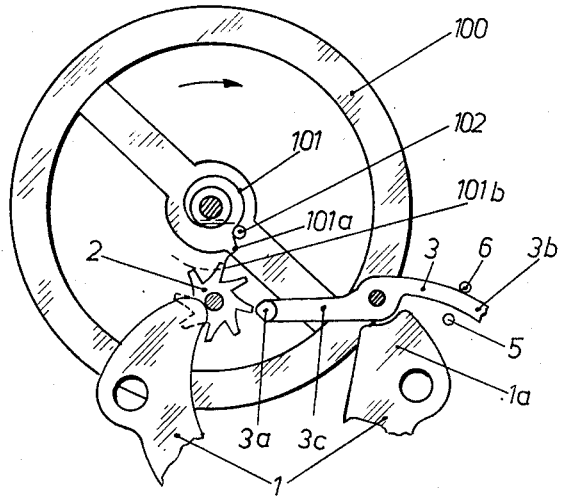
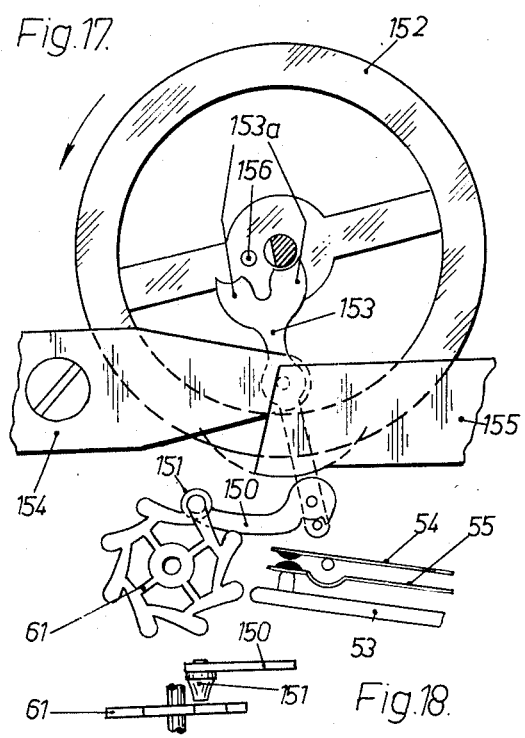
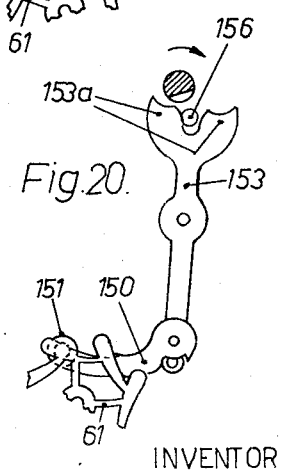

Aug. 19, 1958 H. JUNGHANS ET AL 2,847,818
ELECTROMAGNETICALLY OPERATED CLOCKS
Filed Feb. 18, 1953 6 Sheets-Sheet 6
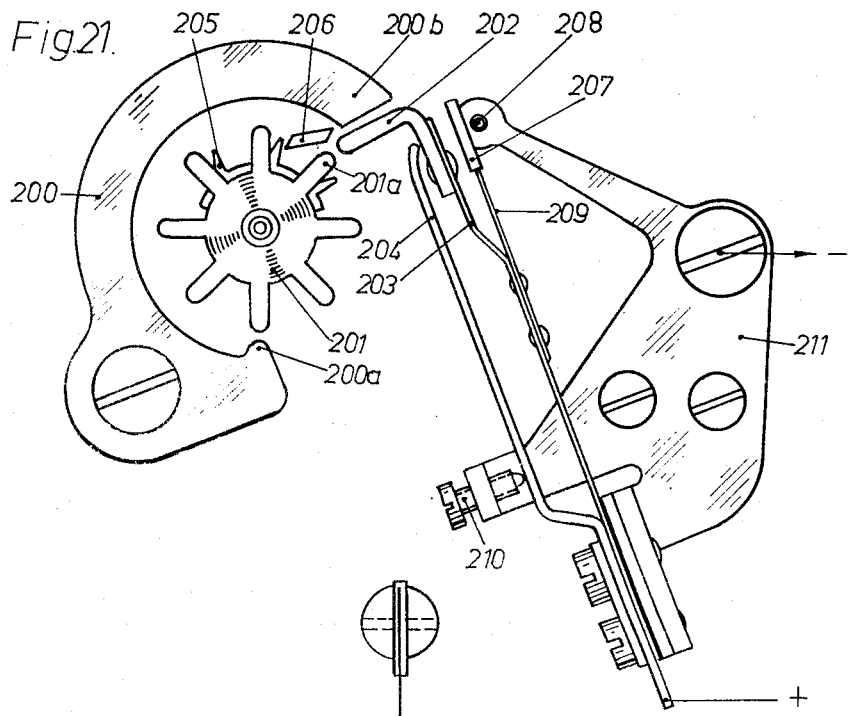
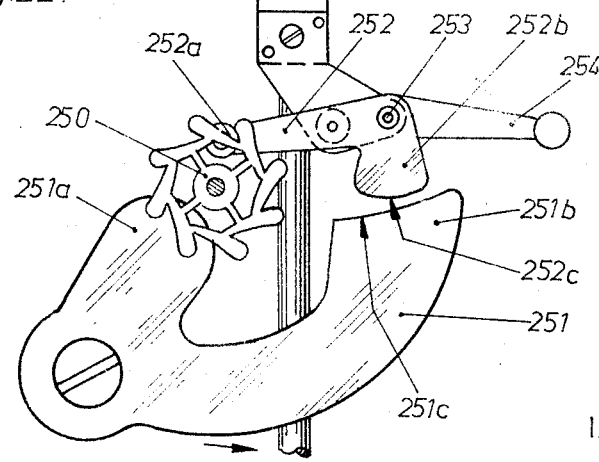
INVENTOR:
H. JUNGHANS & L. HARTNER
BY Young, Emery & Thompson
ATTORNEYS

United States Patent Office 2,847,818
Patented Aug. 19, 1958

2,847,818

ELECTROMAGNETICALLY OPERATED CLOCKS

Helmut Junghans, Schramberg-Sulgen, and Leo Hartner, Schramberg, Germany

Application February 18, 1953, Serial No. 337,624

Claims priority, application Germany February 20, 1952

16 Claims. (Cl. 58—30)

Clocks are known that are provided with a mechanically vibrating balance and driven by electromagnetic impulses from an electric source of energy. The current impulses are generated by a contact device in the circuit of the source of energy, the contacts of said device being closed, according to the occurring impulses, by a balance controlled impulse lever. To this end a special star wheel is used in the movement, said wheel being adapted to arrest the hands train of the clock during every period or cycle of the balance, the latter thus moving by fits and starts, e. g. from second to second.

In the known electromagnetically driven clocks provided with mechanically operated balances, such as pendulum or balance clocks, mechanical switching means disconnect and arrest the hands train and effect the contacts. E. g. in the clocks known under the trademark "ATO," the thrust from the pendulum to the countwheel is performed by a pawl fitted to the pendulum. After said thrust, the count wheel is secured by a catch lever with a bright luster polished and hardened steel roller. When the roller and the toggle respectively are lifted during the thrust, the contact spring is lifted simultaneously. This construction has the disadvantage that particularly because of the movement of the catch roller and the pawl a distinct and not uniform noise becomes audible. In addition to that, the initially excellent result of the operation is not constantly maintained by the clock for a long period. This may be due to the fact that dirt has been accumulated on and at the catch roller, the catching of the roller thus not taking place exactly in the moment when the countwheel tooth passes the summit of the catch roller, but being retarded sometimes. It will be understood that, as with the lifting and catching of the roller also the contacts are operated, the irregular drop of the catch roller is accompanied with an unequal duration of the contact closure. In the latter case a uniform or constant operation is no more ensured.

The present invention obviates said disadvantages. According to the invention, a permanent magnet is arranged in the clock body, and the impulse lever controlling the contact device together with a countwheel mounted on one driving axle of the movement is so designed as to form the armature of said permanent magnet. Thus the motion of the controlling contacts will be effected by utilizing all magnetic attractive forces issued from the stationary permanent magnet.

In a preferred embodiment of the invention, the attractive forces produced by the permanent magnet cause the countwheel driving the hands train to be arrested and the contact device generating the current impulses to be operated. Hereby the thrust imparted by the balance to the countwheel may be mechanically transmitted through a pawl; in a preferred embodiment, however, the thrust may be imparted to the countwheel by making use of magnetic attractive forces.

In clocks designed according to the present invention, the thrust transmission from the balance to the countwheel associated with the impulse lever may be effected directly. However also a special star wheel may be coaxially associated with said countwheel, to which—either mechanically or magnetically—the thrust of the vibrating balance is transmitted.

The advantages resulting from the invention comprise a practically noiseless operation as well as the fact that any lubrication of the running parts may be dispensed with, any risk of the oil to become resinous thus being avoided.

The switch functions being performed by magnetic locks and any fouling due to abrasion no more occurring, a constant operation is ensured for a practically unlimited period, at least as long as the potential of the elements remains constant.

The invention is illustrated in the accompanying drawings, wherein

Fig. 1 shows a pendulum driven timekeeper having a mechanically advanced countwheel, however the countwheel being arrested and locked and the contacts operated by magnetic locks;

Fig. 2 is a plan view according to Fig. 1;

Fig. 3 shows a further position according to Fig. 1;

Fig. 4 is another embodiment of the magnet with pole shoes;

Figs. 5 to 7 illustrate further embodiments of the pole shoe for impulse levers;

Figs. 8 and 9 shown another construction of the pawl;

Figs. 10 and 11 are further examples of the arrangement of the contact springs;

Figs. 12 and 13 show a front elevation and a plan view of another embodiment of the impulse lever;

Figs. 14 and 15 show in front and side elevation a countwheel thrust device provided with a magnetic lock;

Fig. 16 illustrates the locking arrangement of the countwheel and the operation of the contacts by a magnetic lock according to Figs. 1 to 3, the countwheel however driven by an electromagnetically operated balance;

Fig. 17 to 20 shows an eletromagnetically operated balance with magnetic locks for a countwheel drive, countwheel lock and the operation of the contacts; and Figs. 21 and 22 show another embodiment of the invention, providing a special star wheel to which the thrust from the balance or pendulum is imparted.

Referring now to the drawings, a punched or cast or sintered permanent magnet 1, as shown in Fig. 1, induces the countwheel 2 made of steel and the impulse lever 3. An accordingly shaped pole piece 3a is fitted to the end of the impulse lever 3. At every vibration to the left of the pendulum (see arrow) the countwheel 2 is advanced by one pitch through the pawl 4 mounted to the pendulum. The pole 3a being every time magnetically locked by one of the countwheel teeth, the impulse lever is lifted by a certain amount in advancing the countwheel.

Before the pawl disengages the countwheel tooth, the pole 3a is separated from the latter because of the impulse lever abutting with its right arm 3b on a pin 5. The impulse lever, after having been magnetically separated, returns to its original position due to its own weight and the pressure of the contact spring 14 and the arm 3b of the impulse lever 3 engages the pin 6. Hereby the next following tooth of the countwheel will be simultaneously caught and a magnetic lock between the pole 3a and the countwheel tooth is produced respectively. This will be necessary in order to secure the latter in return movements of the pawl, i. e. when the latter slides slightly over the countwheel tooth, or under percussions.

On principle, the pawl is arranged similar to the well known ATO clocks, i. e. it is pivoted on a piece 8 and a pin 9 respectively; the depth of the countwheel engagement may be regulated by means of a screw 10.

The impulse lever 3 and the pole piece 3a are preferably made of magnetic soft iron. Contrary to that, a hardenable steel is to be employed for the countwheel 2, in order to prevent a rapid wear by the operation of the pawl. For the magnetic flux it would be more suitable to use soft iron for the countwheel. The countwheel 2 having, however, a considerably smaller volume compared with the permanent magnet 1, it may also be made of hardenable steel without any disadvantage. As also hardened unalloyed carbon steels are characterized by a remanent magnetism, the teeth have to be re-magnetized by the continuous advance of the countwheel. In using high-grade magnet steels and considering the small volume of the countwheel compared with the magnet, no demagnetizing influences are to be expected.

The arrangement of the timekeeper is well known. The drawing only indicates that the countwheel 2 is fitted to a driver 11. The latter is connected with a driven wheel 12 for the purpose of driving forward the hands.

At every vibration of the pendulum and the lifting of the impulse lever respectively a contact is effected for a short moment by the arm 3b of the impulse lever 3. This contact closes in a known manner the circuit for the driving coil 13, into which a magnet fitted to the pendulum dips. The contact comprises the contact springs 14 and 15. The spring 15 is slightly pre-loaded and the normal position is limited by a pin 16. The spring 14 is also slightly pre-loaded and imparts a slight pressure to the pin 17 of the impulse lever 3, so that after every cycle the impulse lever and its arm 3b respectively positively engages the pin 6. The contact pressure is determined by the pre-load of the spring 15. The contact spring 14 and 15 is in known manner provided with contacts 14a and 15a of precious metal.

The abutments 5 and 6 may be adjustable for facilitating their manufacture and for an extact adjustment repectively, e. g. they may be flexible or shaped eccentrically.

In countwheels of known type and not operated by a magnet, the teeth are generally triangular. In the present case, it will be more suitable to make the teeth as large as possible in order to produce an efficient magnetic flux. This will not prejudice the function of the pawl, the latter engaging only the flank and not the ridge of the tooth.

Other arrangements of the contact springs may also be used. The latter will be described hereinafter. Previously it may be noted that in certain arrangements of the contact spring no additional pressure may be imparted to the impulse lever for better locking the normal position. In the latter case the security may be effected by the weight of the impulse lever, e. g. by the arm 3c being heavier than the arm 3b. In order to provide a more efficient flux, it will be necessary to give the arm 3c a sufficient cross-section.

For better locking the impulse lever in its normal position, the magnetic induction may be employed, provided that the magnet is suitably shaped. As may be seen from the drawing, the pole end 1a of the magnet 1 is concentrically arranged around the impulse lever 3 and the collar 18a of the shaft 18. The enclosure however may be extended, if necessary, along the arm 3c, as shown in the drawing by way of example. Thus a torque in an anti-clockwise sense is imparted to the impulse lever by the induction, causing the arm 3b of the impulse lever 3 to positively engage the pin 6.

Fig. 4 shows an example wherein a pole piece 21 of magnetic soft iron is fitted to the magnet 20. Said pole piece 21 is provided with pole teeth similar to a synchronous motor, whereby a number of the countwheel teeth are magnetically induced and locked in their position of rest. In this case, the impulse lever 3 with the pole piece 3a is similar to that shown in Fig. 1, likewise the countwheel 2 and the pawl 4. In this embodiment, the magnetic flux in the countwheel will be slightly reduced during the advance of the countwheel, i. e. when the countwheel teeth clear the pole teeth. However the magnetic induction is still efficient enough to lift the impulse lever 3 with the contact springs to effect the contact. Immediately after such a cycle the countwheel is positively returned by fits and starts to its position of rest. (This position is shown in Fig. 4.)

Figs. 5 and 6 show another example of the impulse lever, the latter being designated as 22. A pole piece 22a of soft iron is fitted to the impulse lever 22, said pole piece being so shaped as to embrace not only the periphery but also both sides of the countwheel teeth which thus are efficiently induced magnetically. Said embodiment has the advantage that the air gap, such as in Fig. 1, between the pole piece 3a and the countwheel 2 need not be dimensioned as narrow as possible. The type with the pole piece 3a according to Fig. 1 has the further advantage that the turning point of the impulse lever 3 has to be arranged in a predetermined position, such as on the line connecting the staff 11, the pole piece 3a and the staff 18. This position will be necessary, in order to prevent the air gap to be enlarged too much during the motion of the impulse lever and the countwheel and to avoid any contact of the parts. In the arrangement according to Figs. 5 and 6 it will not be necessary to provide a very narrow gap between the pole piece 22a and the periphery of the countwheel, as the countwheel teeth are induced by the lateral arms of the pole piece 22; in addition to that, one is no more strictly bound to determine the turning point for the impulse lever, which will be advantageous when said magnetic switchgear is subsequently inserted in an existing train.

The previously shown countwheel has 8 teeth. According to the length of the pendulum, countwheels having a greater number of teeth, such as 10 teeth or 12 teeth, will be necessary. Fig. 7 shows a countwheel 23 provided with twelve teeth. In this countwheel the pole piece 22a has to be fitted to another point of the impulse lever 22. To this end, the impulse lever 22 is shaped as shown in Figs. 5 to 7, boreholes 22b being provided for the different countwheel teeth. The borings 22b may be made when the impulse lever is manufactured, or the necessary borehole is made at the pre-centered point when the pole piece 22a is mounted.

In the arrangement according to Figs. 1 to 3, the pawl 4 has to be made of a non-magnetic material, in order to avoid any magnetic adhesion to the countwheel teeth. Preferably the pawl may be made of a bronze alloy, a beryllium alloy or the like. In this case the conditions of friction and wear in cooperation with the steel countwheel would be favourable. Still more favourable qualities of friction and wear will be obtained with an arrangement according to Figs. 8 and 9. A pawl 24 which is not situated in the same plane as the countwheel 2, has an impressed pin 25 made of a natural or a synthetic ruby or sapphire, having an area 25a inclined similar to the ground inclined surface of the pawl 4 (as shown in Figure 1). A non-magnetic material, such as brass, is proposed for the pawl 24.

Figs. 10 and 11 show another arrangement of contact springs for the magnetic switchgear according to Figs. 1 to 3. Instead of the contact springs 14 and 15 illustrated in Fig. 1, a single contact spring 26 may be used (see Fig. 10). The contact spring bears on a fixed abutment 27. A contact pin 28 is fitted to the impulse lever 3 and its arm 3a respectively, said pin being made of precious metal. A bearing 26a of precious metal is fitted to the contact spring 26. The abutments 5 and 6 for the impulse lever 3 are similar to those described in Figs. 1 to 3. The current flow in this arrangement is as follows: Contact spring 26—precious metal bearing 26a—contact pin 28—impulse lever 3—conductor spiral 29—coil 30—source of power 31—contact spring 26. The anchoring of the contact spring and the stop pin 27 has to be isolated towards the movement, in order to prevent any current passage and short-circuit respectively to the impulse lever.

Fig. 11 shows also an embodiment having only one contact spring. The contact spring is designated with 32, the precious metal bearing with 32a. A simple lifting pin 33 is fitted to the impulse lever 3 and the arm 3a respectively. Also in this embodiment the current flow does not pass through the impulse lever, similar to the embodiment according to Figs. 1 to 3. The contact pin 34 made of precious metal and cooperating with the contact piece and the precious metal bearing 32a respectively, is mounted to a small block 35, the latter being isolated to the counting train. The diagrammatically shown coil and source of power are also designated as 30 and 31. The anchoring of the contact spring 32 need not be isolated towards the counting train.

All three contact types described above are known, as to their principle, in mechanical switch gears. The present specification is intended to show in what manner the different contact arrangements may be adapted to the magnetic mechanism.

It may be mentioned that in the embodiment according to Fig. 11 the spring 32 has to be retracted by the pin 33 after making the contacts. For this reason, the arm 3c of the impulse lever or crutch 3 has to be made rather heavy, and by conveniently shaping the magnet pole the impulse lever or crutch may have a torque imparted to it.

In the embodiment illustrated in Figs. 1 to 3, a two-armed crutch is used. This is of particular advantage, as the contact parts fitted to the counting train are easily accessible for adjusting and cleaning purposes without dismantling. Figs. 12 and 13 show a one-armed crutch being not rotatably but resiliently supported. The latter embodiment is an essential simplification and may be used in such cases where the contact parts are easily accessible or where a supplementary control after fitting the train to the casing may be dispensed with. The magnet is designated as 30. The pole end 30a serving to induce the countwheel 2 is formed similar to that shown in Fig. 1. The opposite pole 30b is provided with a pole piece 31. The crutch 32 has a spring 33 fitted to it. The end of the spring 33 enters a slot of the pole piece 31 and is fixed therein; it may also be fixed by means of screws or rivets. Due to the pressure of the spring and its own weight the crutch 32 abuts on a fixed stop 34. Thus the position of the countwheel will be magnetically locked. The spring 33 may preferably be made of a magnetic material. This however is not absolutely necessary, as due to the small air gap between the crutch 32 and the pole piece 31 a sufficient induction will be obtained. The arrangement of the pawl is exactly similar to that shown in Figs. 1 to 3; likewise the arrangement of the contact springs 35 and 36 is on principle similar to that shown in Figs. 1 to 3. The maximum impulse position is indicated by dotted lines.

In an embodiment according to Figs. 14 and 15, the thrust or push from the pawl to the countwheel is effected by a magnetic locking. The pole end of the magnet 50 is provided with a pole piece 51, to which a spring 52 bearing a crutch 53 is fitted. The arrangement of the crutch 53 and the arrangement of the contact springs 54 and 55 is on principle similar to the design explained in connection with Figs. 12 and 13. Of course also the contact springs used in the type according to Figs. 12 and 13 may be similar to those described in connection with Figs. 10 and 11. The pole end 50a is formed concentrically towards the turning point of the pendulum. During the vibrations of the pendulum, the gap between the pawl 56 and the pole 50a will therefore remain constant. The pawl 56 is induced by the pole 50y. A pole piece 57 is fitted to the pawl 56. The parts 56 and 57 are suitably made of magnetic soft iron. As no continuous re-magnetisations take place, no high-grade magnet soft iron having a high permeability is required, the usual ingot iron being quite sufficient. The pawl 56 is supported on a staff 58. The latter is provided with a compensating piece 59 preferably made of non-magnetic material, from which a weight 60 serving as a balancing means for the center of gravity is suspended.

The magnetic flux passes from the countwheel tooth through the air gap to the crutch 53 through spring 52, pole piece 51, magnet 50, pole 50a to the pawl 56 and from this point through an air gap to one of the countwheel teeth.

The teeth of the countwheel 61 have a special shape, in order to propel the countwheel by one pitch when the pendulum swings to the left, and to lock the countwheel in its normal position when the pendulum swings back or to the right. Fig. 14 shows the normal position of the countwheel. The countwheel tooth 61a is retained by the crutch 53, the latter abutting on the fixed stop 62. The pendulum is on the point to swing to the right (see arrow), the pole piece 57 fitted to the pawl 56 sliding along the magnetically locked tooth 61b chamfered to the right. When the pole piece 57 has reached the weakest point of the tooth 61b after a full swing of the pendulum, it will be drawn within reach of the bead-like end of the tooth 61c. When the pendulum swings again to the left, the pole piece 57 remains in a magnetic locking with the bead-like extremity of the tooth 61c and pushes it on by one pitch. The return of the pole piece 57 takes place, as mentioned above, in such a way that the pole piece 57 slides back along the chamfered root of the tooth. As in that case no abrupt separation of the pole piece 57 from the countwheel tooth takes place, the tooth within reach of the crutch 53 is positively retained. Contrary to that, the magnetic forces are so dimensioned that when the countwheel is propelled, the crutch 53 will be angularly moved by a certain amount and again released, the countwheel tooth remaining in magnetic locking with the pole piece 57.

The pawl 56 is provided with a safety pin 63 having sufficient clearance in a corresponding recess of the bearing bridge 64. Said pin serves to cause the pawl 56, when subject to percussions or during the transport, to swing only to such an extent as to be returned by magnetic forces within reach of the countwheel. The pawl 56 is mounted on the box 65 and the latter on the staff 58. The ring 67 serves to axially limit the staff 58. The manner of supporting the pawl 56 is only shown by way of example and there are of course different possibilities of journalling. The pawl 56 may also be flyingly mounted on a fixed pin. The bearing blocks 64 and 68 as well as the journal 65 may be suitably made of a non-magnetic material.

Figs. 16 to 20 illustrate further types of electromagnetically driven balances with switch and contact mechanisms operated by magnetic lockings.

Fig. 16 shows a design similar to that illustrated and described in Figs. 1 to 3, however a balance is used instead of a pendulum. As in Figs. 1 to 3, the parts having a similar arrangement are provided with the same reference numbers, such as the impulse lever or crutch 3, magnet 1 &c. Instead of a pawl, a spiral 101 is centrically mounted on the balance 100. The bent up end 101a abuts against a pin 102 inserted in the balance. When the balance swings in a clockwise sense (see arrow), the extremity 101b of the spiral 101 propels the countwheel by one pitch. Hereby the bent up part 101a of the spiral is still more pressed against the abutment pin or stop pin 102. The spring thus becomes inflexible and the countwheel will be positively propelled.

When the balance returns in an anti-clockwise sense, the spiral end 101b is only allowed to ride slightly on the countwheel teeth, in order to ensure that the countwheel remains in its normal position, i. e. to prevent that it returns. As described in Figs. 1 to 3, the countwheel is in this case magnetically locked by the pole piece 3a, until the next following impulse is imparted to it. When the balance swings back, the end 101b and the bent up part 101a of the spiral respectively clears the stop pin 102, whereby a soft sliding from the countwheel tooth is ensured.

The balance wheel is electromagnetically driven in a known manner. The use of a spiral as a push element is relatively simple and little expensive and is only shown by way of example. There are also other constructive possibilities, such as a punched pawl or the like. In this case the pawl and the balance are to be to shaped as to avoid any displacement of the center of gravity during the vibrations of the balance.

Figs. 17 to 20 show an electromagnetically driven balance, the countwheel being propelled by means of a magnetic lock. The countwheel, the impulse lever or crutch and the contacts are similar to those described in connection with Figs. 14 to 15. These parts are provided with the same reference numbers, the countwheel having the number 61, the crutch 53, the contact springs 54 and 55. A pawl 150 is magnetically locked with the countwheel 61, on principle such as described with reference to Figs. 14 and 15. The connection between the pawl 150 and the balance 152 takes place by means of a fork 153. The extremities of the fork 153a are similarly shaped as those of a mechanical balance escapement using pins. The fork 153 is supported on a block 154. The magnet 155 and its pole end respectively is concentrically shaped towards the turning point of the fork 153. Thereby the countwheel is propelled by one pitch in an anticlockwise sense due to the magnetic lock of the pole piece 151 with the countwheel.

Fig. 19 shows the phase of thrusting movement. The balance pin 156 engages with the notch of the fork.

Fig. 20 shows the instant where the balance pin 156 during an inverse vibration swings again into the notch of the fork, the fork 153 thus being angularly moved in an anti-clockwise sense. The pole piece 151 then slides on the chamfered tooth root because of the magnetic lock. The operation is the same as explained with reference to the Figs. 14 and 15.

Figs. 17 to 20 are only diagrammatic illustrations. Also in this construction it will be advantageous to form the fork 153 and the pawl 150 in such a manner as to avoid displacements of the center of gravity during the vibrations, the balance pin 156 having to overcome only the frictional resistance of the fork bearing the pawl bearing as well as the thrust required for the countwheel.

For limiting the terminal positions of the fork 153, fixed stop pins may be provided for safety purposes, similar to the anchor forks of mechanical balance escapements.

In the constructions shown in Figs. 1 to 20, the thrust of the balance or pendulum is directly imparted to the countwheel cooperating with the impulse lever. It has been found to be advantageous to mount a special star wheel on the staff of the countwheel, upon which the balance or pendulum imparts a thrust. Thus it will be possible to use a permanent magnet for small dimensions, and the star wheel transmitting the thrust may be made of non-magnetic material. The pawl fitted to the pendulum may then also be made of steel, as it is not magnetically influenced. As will be seen from Fig. 21, the magnet 200 has very small dimensions and is arranged around the periphery of the count or star-shaped wheel 201 controlling the impulse lever. Through the poles 200a and 200b of the permanent magnet 200 always two teeth of the star-shaped wheel 201 formed as a spoked wheel are magnetically induced and locked in their position during the interval; simultaneously the impulse lever 202 fixed on a spring 203 is induced as an anchor. During the switch interval a tooth 201a of the countwheel is opposite to the lever 202 and the impulse lever 202 is attracted towards the tooth 201a, until it abuts on the stop 204. Then only a small air gap will be between the anchor part of the impulse lever 202 and the tooth 201.

The pole face of the pole 200b extends tangentially towards the turning point of the spring 203, the air gap towards the pole 200b of the magnet thus remaining always constant during the movement of the anchor part of the impulse lever 202.

As will be seen from Fig. 21, on the same staff of the star-shaped wheel a star wheel 205 (in the drawing partly broken off) made of any suitable material is mounted, said star wheel being propelled at each vibration of the pendulum by a pawl 206 fitted to the pendulum. As soon as the star wheel 205 and simultaneously the star-shaped wheel 201 are propelled by the pawl 206 in an anti-clockwise sense, the tooth 201a is removed from the anchor portion of the lever 202. The air gap is increased and the magnetic forces are no more sufficient to press the impulse lever 202 against the stop 204, the spring 203 being pre-loaded. Due to the pre-load of the spring and the decreasing magnetic forces the contact pin 207 is pressed against the contact pin 208. During the interval, i. e. in the position shown in Fig. 21, the contact pin 207 has no contact with the contact pin 208, i. e. a small air gap will exist. During the switch movement caused by the pawl 206 the impulse lever 202 will be released for a short instant with the effect to cause a short contact. The duration of the latter which is to be short with regard to a satisfactory operation, the air gap may be adjusted by suitably dimensioning the magnet.

It may be mentioned that the contact spring 207, the impulse lever 202 and the stop 204 are isolated against a bridge 211 on which they are mounted. The bridge 211 and the contact pin 208 are connected to frame. As will be seen from the Fig. 21, the mass of the anchor 202 in the new construction is very small, only slight losses in the magnetic flux occurring. In addition to that, the spring 203 will hardly be damaged by percussions or the like during the transport. Fig. 22 shows on the same axle with the star-shaped wheel 201 a magnetic star wheel 250. As to its function, the Fig. 22 essentially corresponds to the Figs. 14 and 15, and the permanent magnet 251 to be provided may be very small. The flux takes the shortest way. Through the pole 251a not only a single tooth of the star wheel 250 is magnetically induced, but an essential portion of the wheel, the flux during the thrust thus remaining nearly constant. The thrust lever 252 magnetically coupled to the teeth of the star wheel 250 through a small air gap, is provided with a pole pin 252a. A segment-shaped extension 252b of the switch lever 252 is magnetically connected through a small air gap to the pole 251b of the permanent magnet 251. The edge 252c of the lever extends concentrically towards the turning point 253, while the edge 251c extends radially to the turning point of the pendulum, with the result that during the vibration of the pendulum and the motion of the lever 252 the air gap between 252b and 251c remains always constant. 254 designates a lever for compensating the center of gravity. The latter need not be made of a ferromagnetic material, the flux thus starting from 251a, 250, 251b, 252b, 252, 252a.

Fig. 22 illustrates the moment wherein the pendulum performs a vibration to the right. Hereby the star wheel 250 is locked against return movement by the star-shaped wheel 201. The pole pin 252a fitted to the lever 252 slides along the chamfered tooth of the star wheel 250 until it reaches the next tooth. In this position the pendulum has reached its maximum amplitude. The pole pin 252a is then attracted by the club-shaped tooth point. During the subsequent vibration to the left, the tooth of the star wheel 250 is propelled by one pitch due the magnetic forces, which corresponds to a full vibration of the pendulum.

The figures illustrate only examples of the invention and may be modified in many forms, taking care of the characteristic principles of the invention.

We claim:

1. In an electromagnetically operated clock, a mechanically oscillating time controlling member, an electric circuit including a magnetizing coil and a source of power for supplying oscillations sustaining power to the mechanically oscillating member by means of electrical current impulses applied to the magnetizing coil cooperating with the oscillating member, an interrupting switching member having contacts for supplying the said current impulses provided in the circuit having contacts, said switching member being controlled by the oscillating member, a driving catch on the oscillating member, a ratchet wheel of ferromagnetic material rotatably mounted in the path of rotation of and driven by the said driving catch, a control lever of ferromagnetic material mounted adjacent the ratchet wheel and adapted to actuate one of the contacts, a permanent magnet adjacent the ratchet wheel and the control lever, said ratchet wheel and said control lever being mechanically out of contact and forming the armature of the permanent magnet whereby upon rotation of the ratchet wheel a force is exerted upon the control lever.

2. An electromagnetically operated clock according to claim 1 in which a pivotal mounting is provided for the control lever.

3. An electromagnetically operated clock according to claim 1 in which a spring blade is provided for supporting the control lever.

4. An electromagnetically operated clock according to claim 1 in which the permanent magnet is provided with toothed pole pieces cooperating with the teeth of the ferromagnetic ratchet wheel.

5. An electromagnetically operated clock according to claim 1 in which abutting pins are provided for limiting the movement of the control lever with the latter being resiliently biased into its idle position.

6. An electromagnetically operated clock according to claim 1 in which a pole piece is provided for the control lever to contact the ratchet wheel.

7. An electromagnetically operated clock according to claim 1 in which a spring blade is provided to support the control lever mounted on one of the pole pieces of the permanent magnet.

8. An electromagnetically operated clock according to claim 1 in which the oscillating time controlling member is a hair spring controlled balance, a further hair spring mounted to the said balance as a driving catch, an abutment pin on the balance, said last-mentioned hair spring abutting against the abutment pin mounted on the balance in the driving portion of the period of the balance and being resiliently yielding in the idle portion of the period.

9. In an electromagnetically operated clock, a mechanically oscillating time controlling member, an electric circuit including a magnetizing coil and a source of power for supplying oscillation sustaining power to the mechanically oscillating member by means of electric current impulses applied to the magnetizing coil cooperating with the oscillating member, an interrupting switching member for supplying the said current impulses provided in the circuit, said switching member being controlled by the oscillating member, a driving catch oscillatably pivoted to the oscillating time controlling member, and a ratchet wheel of ferromagnetic material cooperating with the said driving catch and a permanent magnet having spaced pole pieces and adjacent the ratchet wheel, the arresting action during the idle periods of the clock being performed by the action of the magnetic forces between a plurality of teeth of the ferromagnetic ratchet wheel and the plurality of correspondingly spaced pole pieces of the permanent magnet, the driving catch also being made of ferromagnetic material and forming part of the armature of the permanent magnet and being in magnetic co-operation with the ratchet wheel to impart driving forces to the latter.

10. In an electromagnetically operated clock, a mechanically oscillating time controlling member, an electric circuit including a magnetizing coil and a source of power for supplying oscillation sustaining power to the mechanically oscillating member by means of electrical current impulses applied to the magnetizing coil cooperating with the oscillating member, an interrupting switching member having contacts for supplying the said current impulses provided in the circuit, said switching member being controlled by the oscillating member, a driving catch pivoted on the oscillating member, a ratchet wheel with teeth of ferromagnetic material rotatably mounted in the path of rotation of and driven by the said driving catch, a control lever of ferromagnetic material mounted adjacent the ratchet wheel and adapted to actuate one of the contacts of the switching member, said ratchet wheel and the control lever being magnetized and mechanically out of contact but being magnetically coupled with each other for supplying moving power from the ratchet wheel to the control lever when the ratchet wheel is rotated.

11. In an electromagnetically operated clock, a mechanically oscillating time control member, an electric circuit including a magnetizing coil and a source of power for supplying oscillation sustaining power to the mechanically oscillating member by means of electrical current impulses applied to the magnetizing coil cooperating with the oscillating member, an interrupting switching member having contacts for supplying the said current impulses provided in the circuit, said switching member being controlled by the oscillating member, a driving catch pivoted on the oscillating member, a shaft and a ratchet wheel mounted thereon and in the path of movement of the driving catch, the driving catch driving the ratchet wheel, said ratchet wheel being in the form of a ferromagnetic star-shaped wheel, a control lever of ferromagnetic material mounted adjacent the ratchet wheel and adapted to actuate the contact of the switching member, said ratchet wheel and said control lever being magnetized and being magnetically coupled with each other for supplying moving power from the said ratchet wheel to the control lever, the ferromagnetic teeth of the said ratchet wheel exerting a controlling power upon the control lever when the said ratchet wheel is rotated.

12. In an electromagnetically operated clock, a mechanically oscillating time controlling member, an electric circuit including a magnetizing coil and a source of power for supplying oscillation sustaining power to the mechanically oscillating member by means of electrical current impulses applied to the magnetizing coil cooperating with the oscillating member, an interrupting switching member with springs having contacts for supplying the said current impulses provided in the circuit, said switching member being controlled by the oscillating member, a driving catch pivoted on the oscillating member, a ratchet wheel mounted on a shaft and driven by the driving catch, said ratchet wheel being star-shaped and composed of ferromagnetic material, a control lever of ferromagnetic material mounted adjacent the ratchet wheel and adapted to actuate the contact of the switching member, a permanent magnet adjacent the ratchet wheel and the control lever, the said star-shaped wheel and the said control lever being mechanically out of contact and forming the armature of the permanent magnet so that upon rotation of the said star-shaped wheel a force is exerted upon the control lever.

13. An electromagnetically operated clock according to claim 12, in which a spring blade is provided to support the control lever, the permanent magnet being horseshoe-shaped, a ferromagnetic transversely bent part of the control lever oscillating an equal distance from one of the pole pieces of the horseshoe magnet.

14. An electromagnetically operated clock according to claim 1, in which the oscillating time controlling member is a hair spring controlled balance, an abutment pin on the balance, and a further hair spring mounted to the said balance as a driving catch, said last-mentioned hair spring abutting against the abutment pin in the driving portion of the period of the balance and being resiliently yielding in the idle portion of the period.

15. In an electromagnetically operated clock, a mechanically oscillating time controlling member, an electric circuit including a magnetizing coil and a source of power for supplying oscillation sustaining power to the mechanically oscillating member by means of electrical current impulses applied to the magnetizing coil cooperating with the oscillating member, an interrupting switching member with springs having contacts for supplying the said current impulses provided in the circuit, said switching member being controlled by the oscillating member, a driving catch pivoted on the oscillating member, a ratchet wheel of ferromagnetic material to be driven by the said driving catch, a control lever of ferromagnetic material mounted adjacent the ratchet wheel and adapted to actuate the contact springs, and a permanent magnet rigidly mounted adjacent the ratchet wheel and the control lever, the said ratchet wheel and the said control lever being mechanically out of contact and forming the armature of the permanent magnet so that upon rotation of the ratchet wheel a force is exerted upon the control lever, the driving catch also being of ferromagnetic material and forming part of the armature of the permanent magnet and the driving catch also being solely in magnetic cooperation with the ratchet wheel, so as to impart driving forces to the latter.

16. An electromagnetically operated clock according to claim 15, in which the driving catch is oscillatably mounted on the time controlling oscillating member, the ratchet wheel being provided with curved end parts for obtaining a unidirectional rotation.

References Cited in the file of this patent

UNITED STATES PATENTS

| 1,651,119 | Hatot | Nov. 29, 1927 |
| 2,195,311 | Hurst | Mar. 26, 1940 |
| 2,459,930 | Fink | Jan. 25, 1949 |